(12) United States Patent
Watanabe et al.

(10) Patent No.: US 11,822,195 B2
(45) Date of Patent: Nov. 21, 2023

(54) DISPLAY DEVICE

(71) Applicant: Japan Display Inc., Tokyo (JP)

(72) Inventors: Kyosuke Watanabe, Tokyo (JP); Jin Hirosawa, Tokyo (JP); Masanobu Ikeda, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/901,862

(22) Filed: Sep. 2, 2022

(65) Prior Publication Data
US 2023/0061880 A1   Mar. 2, 2023

(30) Foreign Application Priority Data
Sep. 2, 2021   (JP) .................................. 2021-143091

(51) Int. Cl.
*G02F 1/1362*   (2006.01)
*G02F 1/1368*   (2006.01)

(52) U.S. Cl.
CPC ...... *G02F 1/136227* (2013.01); *G02F 1/1368* (2013.01); *G02F 1/136209* (2013.01); *G02F 1/136222* (2021.01); *G02F 1/136286* (2013.01)

(58) Field of Classification Search
None
See application file for complete search history.

(56) References Cited

U.S. PATENT DOCUMENTS

| | | | |
|---|---|---|---|
| 2004/0012725 A1* | 1/2004 | Tomioka | G02F 1/134363 349/43 |
| 2007/0046883 A1* | 3/2007 | Shimizu | G02F 1/134363 349/141 |
| 2007/0070280 A1* | 3/2007 | Chang | G02F 1/134363 349/47 |
| 2008/0024416 A1* | 1/2008 | Onogi | H01L 27/1244 345/87 |
| 2013/0050604 A1* | 2/2013 | Yonekura | G02F 1/1343 349/149 |
| 2014/0131718 A1* | 5/2014 | Xue | G02F 1/1345 257/71 |
| 2016/0254275 A1* | 9/2016 | Feng | H01L 33/42 257/72 |
| 2017/0184931 A1* | 6/2017 | Zhang | G02F 1/136209 |
| 2017/0343873 A1* | 11/2017 | Ma | G02F 1/136213 |
| 2019/0056620 A1* | 2/2019 | Akiyoshi | H01L 27/124 |
| 2019/0302940 A1* | 10/2019 | Nie | G06F 3/04164 |
| 2022/0130943 A1* | 4/2022 | Wang | G09F 9/33 |
| 2022/0308378 A1* | 9/2022 | Ozeki | H01L 29/78633 |

FOREIGN PATENT DOCUMENTS

JP   2019-35884 A   3/2019

* cited by examiner

*Primary Examiner* — Ryan Crockett
(74) *Attorney, Agent, or Firm* — XSENSUS LLP

(57) ABSTRACT

According to one embodiment, a display device includes a display area, a peripheral area, a pixel electrode disposed, a switching element, a scanning line, a signal line, a metal layer which overlaps at least one of the signal line and the scanning line, an antireflection layer which covers the metal layer, a common electrode which covers the antireflection layer and a power supply line disposed in the peripheral area, to which a common voltage is supplied. The common electrode and the metal layer are connected to the power supply line in the peripheral area.

19 Claims, 15 Drawing Sheets

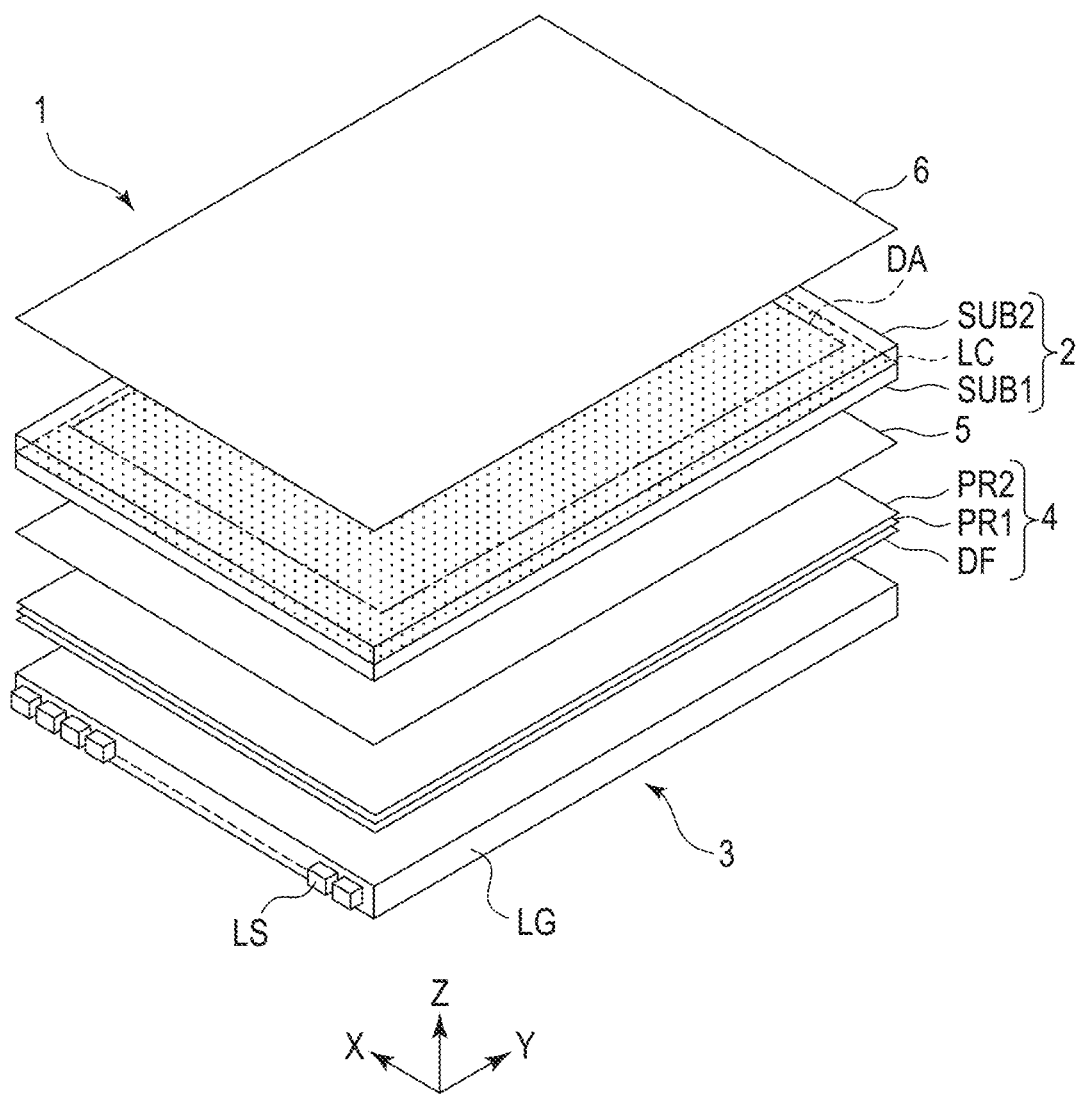
F I G. 1

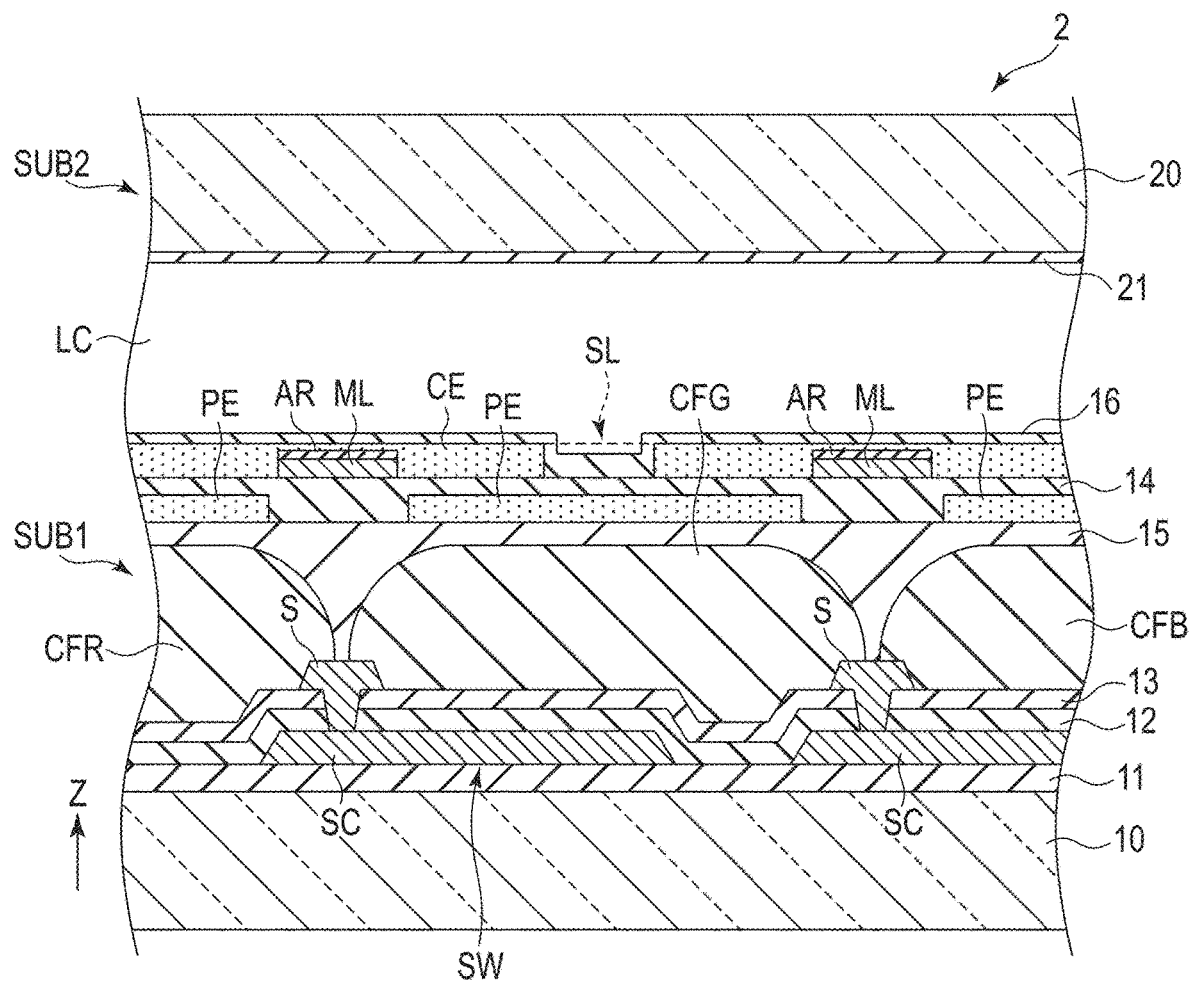
F I G. 4
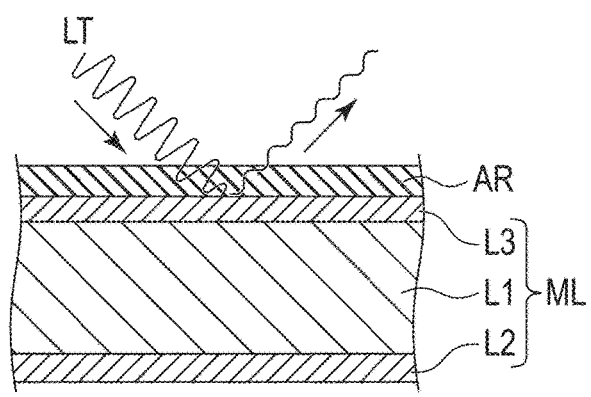
F I G. 5

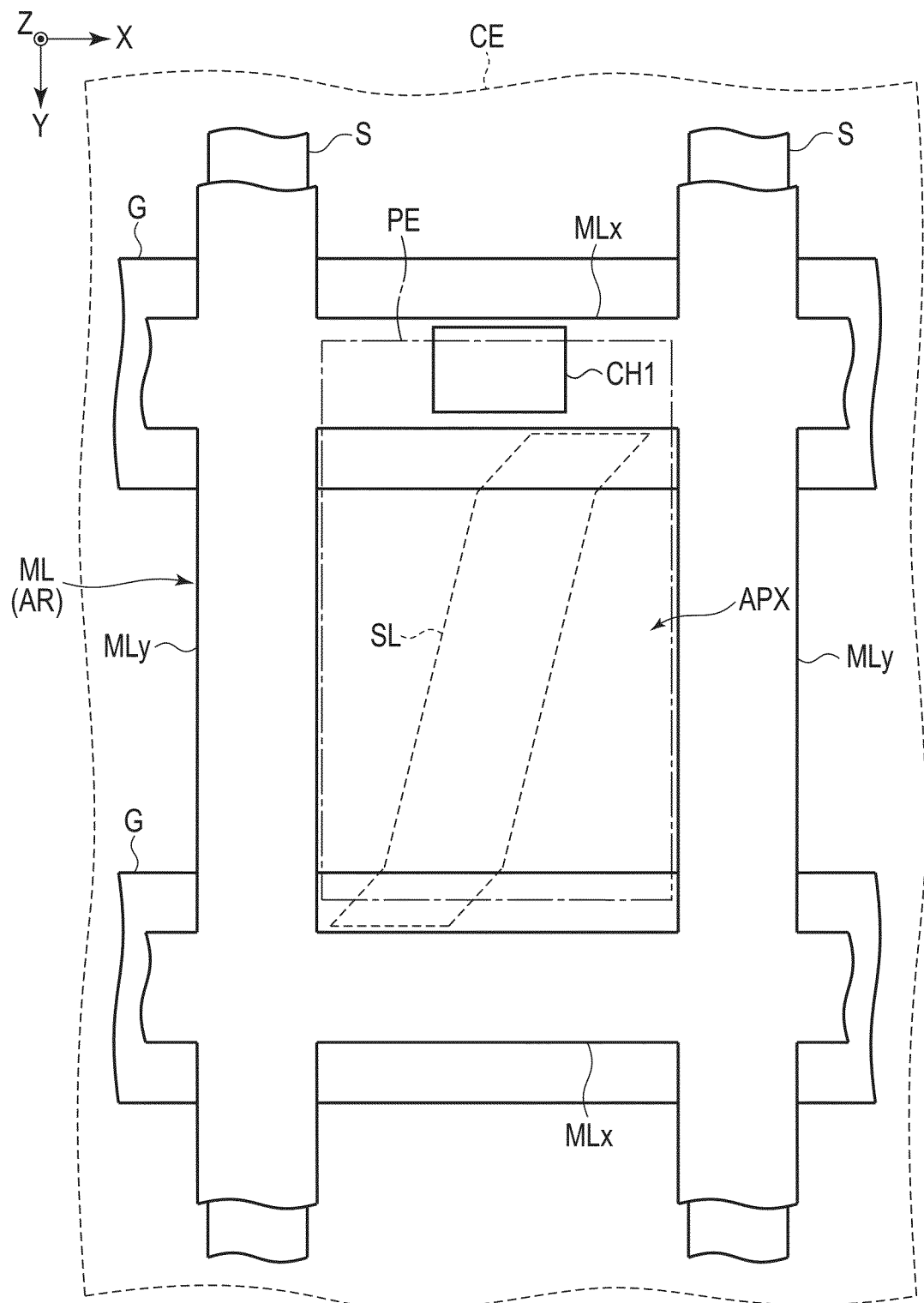
F I G. 6

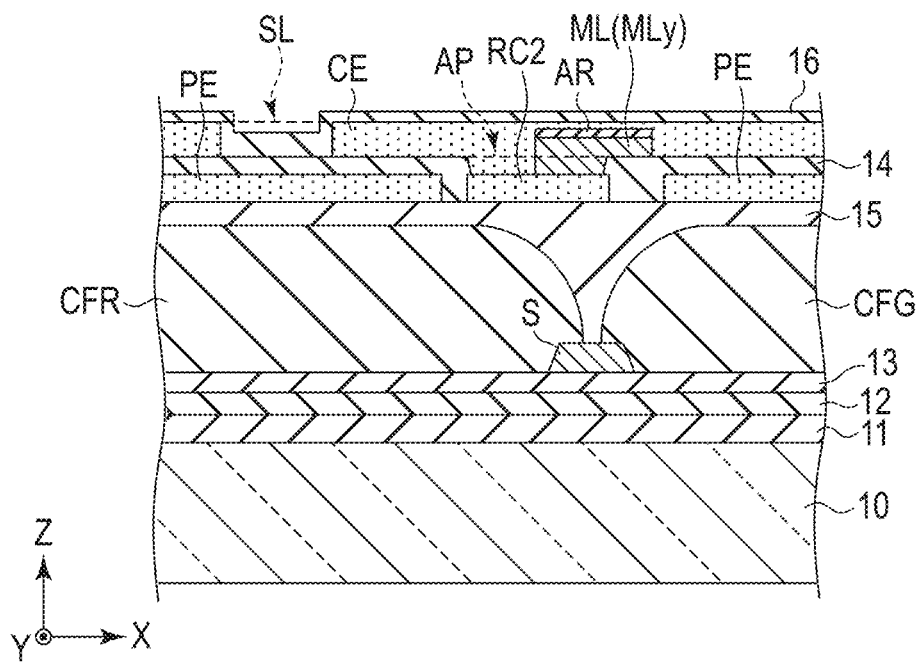
F I G. 12
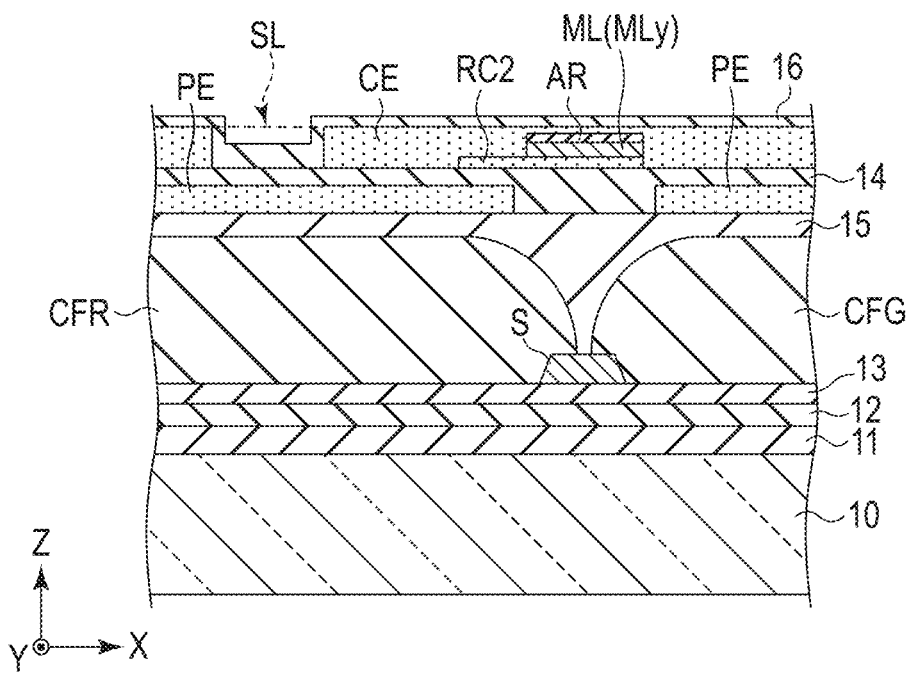
F I G. 13

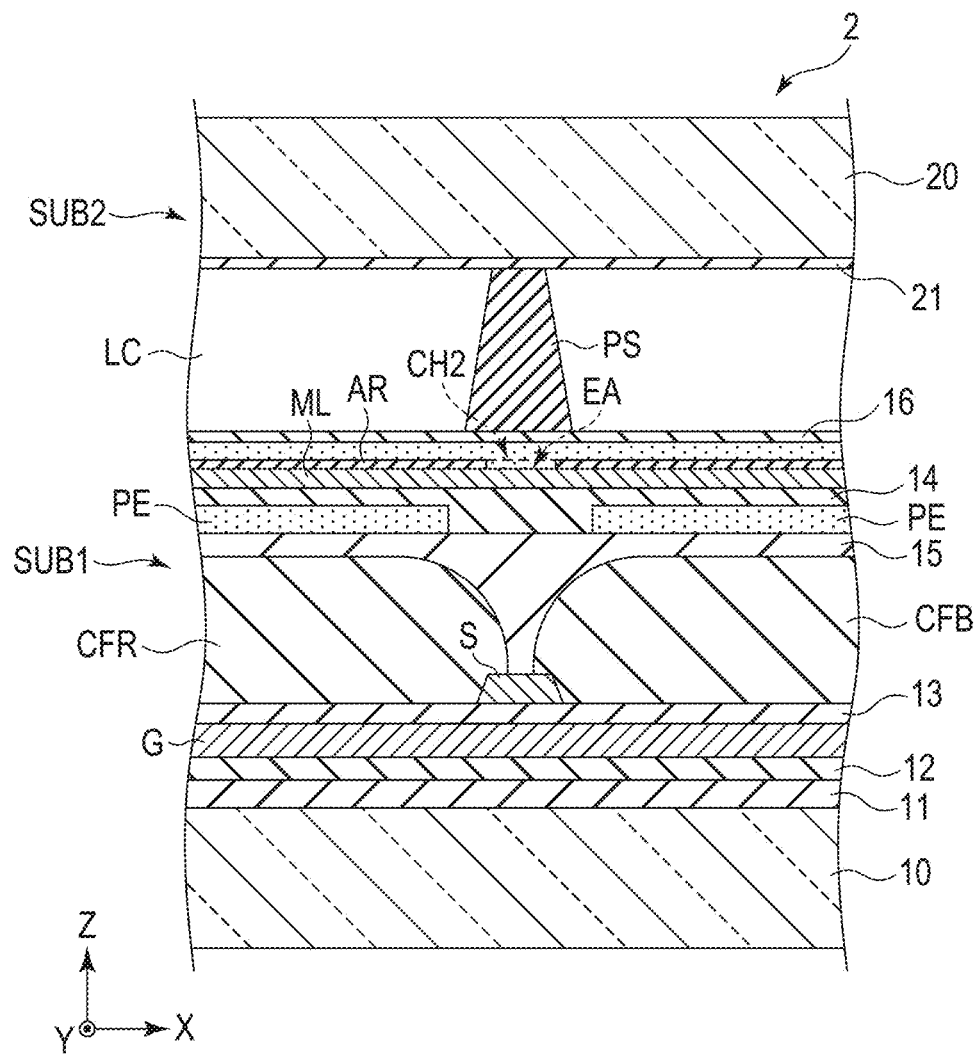
F I G. 15

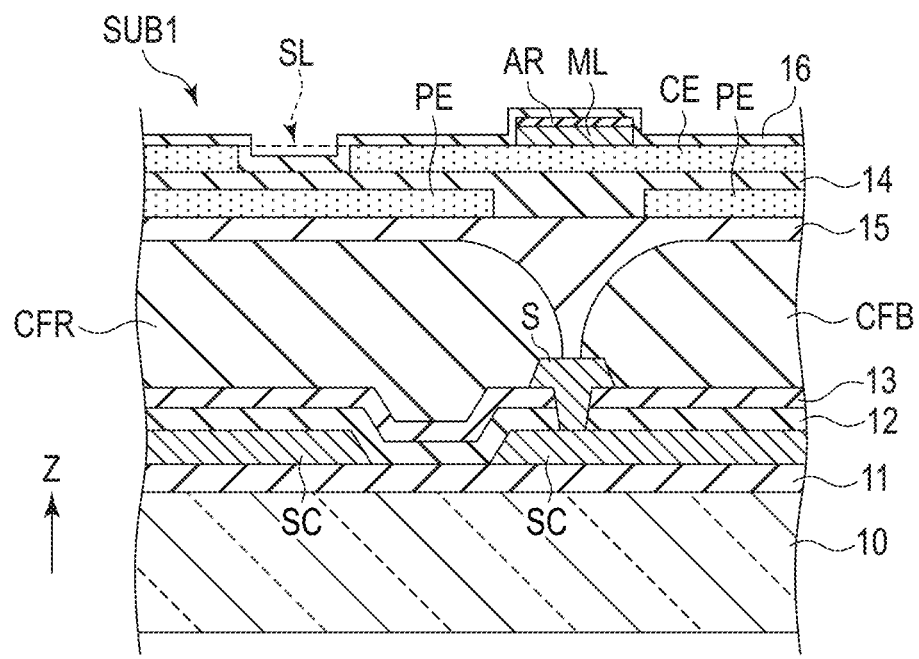
F I G. 17
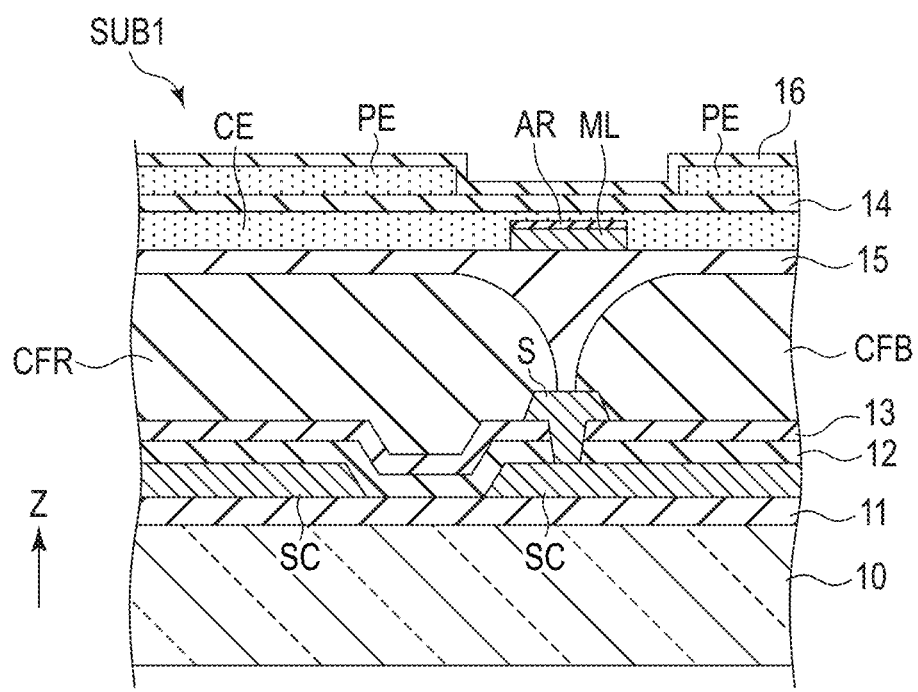
F I G. 18

DISPLAY DEVICE

CROSS-REFERENCE TO RELATED APPLICATIONS

This application is based upon and claims the benefit of priority from Japanese Patent Application No. 2021-143091, filed Sep. 2, 2021, the entire contents of which are incorporated herein by reference.

FIELD

Embodiments described herein relate generally to a display device.

BACKGROUND

In display devices such as liquid crystal displays, a metal layer at the same potential as that of the common electrode formed of a transparent conductive material such as indium tin oxide (ITO) may be provided at the boundary of pixels. Since the metal layer can reflect outer light, some countermeasures are necessary.

BRIEF DESCRIPTION OF THE DRAWINGS

FIG. 1 is an exploded perspective view schematically showing a display device according to the first embodiment.

FIG. 4 is a cross-sectional view schematically showing the display panel according to the first embodiment.

FIG. 5 is a cross-sectional view schematically showing a metal layer and an anti-reflection layer according to the first embodiment.

FIG. 6 is a plan view schematically showing some of elements disposed in a display area of a first substrate according to the first embodiment.

FIG. 12 is a cross-sectional view schematically showing the first substrate taken along line XII-XII in FIG. 11.

FIG. 13 is a cross-sectional view schematically showing a first substrate according to the fifth embodiment.

FIG. 15 is a cross-sectional view schematically showing the display panel taken along line XV-XV in FIG. 14.

FIG. 17 is a cross-sectional view schematically showing a first substrate according to the eighth embodiment.

FIG. 18 is a cross-sectional view schematically showing a first substrate according to the ninth embodiment.

DETAILED DESCRIPTION

Figure 2:
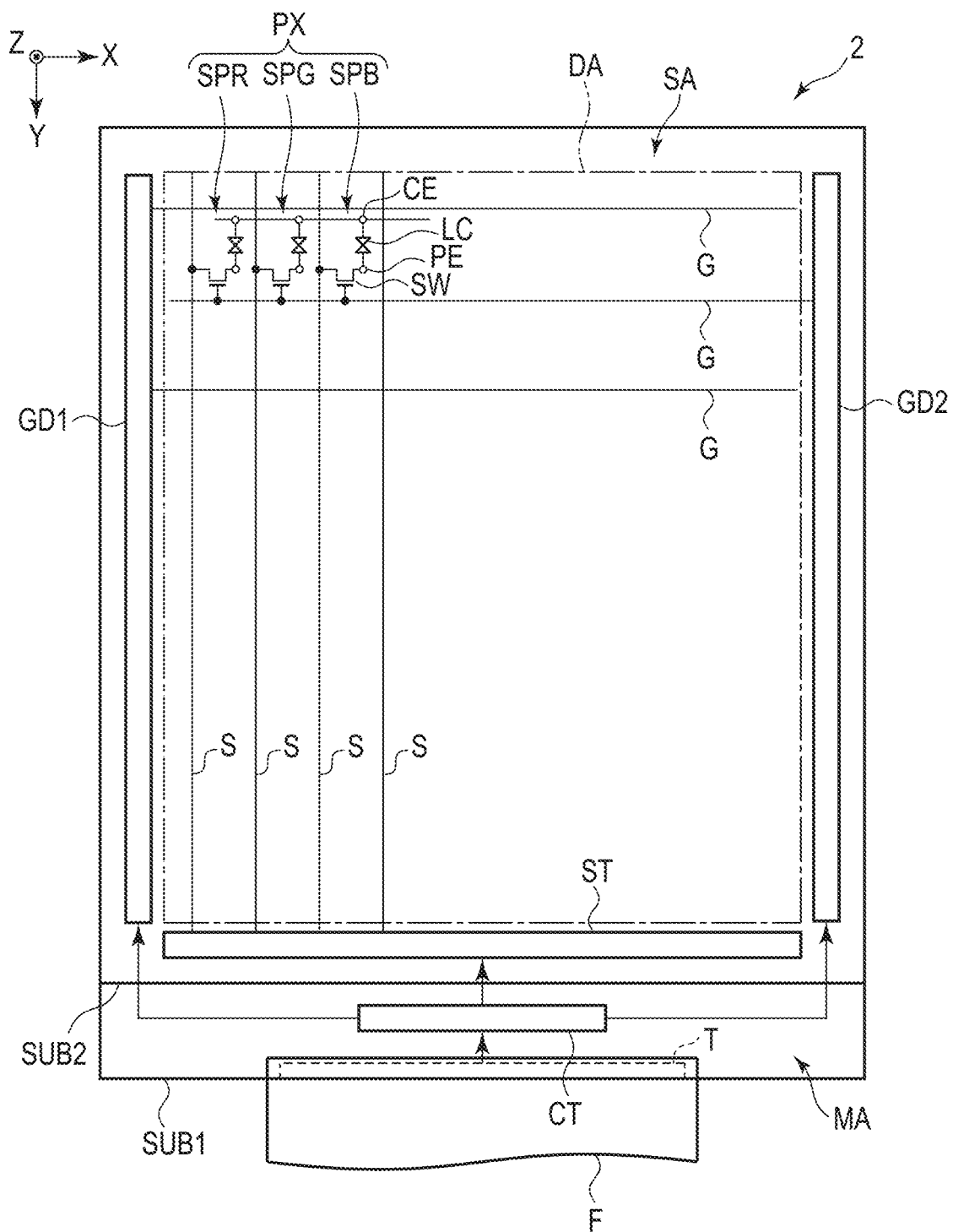
FIG. 2 is a plan view schematically showing the display panel of the first embodiment.

In general, according to one embodiment, a display device comprises a display area including a pixel, a peripheral area around the display area, a pixel electrode disposed in the pixel, a switching element connected to the pixel electrode, a scanning line which supplies a scanning signal to the switching element, a signal line which supplies a video signal to the switching element, a metal layer which overlaps at least one of the signal line and the scanning line, an antireflection layer which covers the metal layer, a common electrode which covers the antireflection layer and a power supply line disposed in the peripheral area, to which a common voltage is supplied. The common electrode and the metal layer are connected to the power supply line in the peripheral area.

According to another embodiment, a display device comprises a display area including a pixel, a pixel electrode disposed in the pixel, a switching element connected to the pixel electrode, a scanning line which supplies a scanning signal to the switching element, a signal line which supplies a video signal to the switching element, a metal layer which overlaps at least one of the signal line and the scanning line, an antireflection layer which covers the metal layer, a common electrode which covers the antireflection layer and a relay conductive layer disposed in the display area and in contact with the metal layer and the common electrode.

According to still another embodiment, a display device comprises a display area including a pixel, a pixel electrode disposed in the pixel, a switching element connected to the pixel electrode, a scanning line which supplies a scanning signal to the switching element, a signal line which supplies a video signal to the switching element, a metal layer which overlaps at least one of the signal line and the scanning line, an antireflection layer which covers the metal layer and a common electrode which covers the antireflection layer. The metal layer includes an exposed area which is not covered by the antireflection layer, and the common electrode being in contact with the exposed area.

With the above-provided structure, it is possible to provide a display device which can suppress reflection of outer light.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof may be omitted unless otherwise necessary.

Each of the embodiments discloses a liquid crystal display device including a liquid crystal display element as an example. However, each embodiment does not preclude the application of individual technical concept disclosed therein to display devices with other types of display elements, such as organic electroluminescent display elements, micro-LEDs or mini-LEDs. The technical concepts disclosed in each embodiment can as well be applied to array substrates and electronic devices with sensor elements such as capacitive sensors, optical sensors and the like.

First Embodiment

FIG. 1 is an exploded perspective view schematically showing a liquid crystal display device 1 (to be referred to as a display device 1 hereinafter) according to the first embodiment. An X direction, a direction Y and a direction Z are defined as shown in the drawings. The X, Y, and Z directions are orthogonal to each other in this embodiment, but may intersect at angles other than right angles. Viewing the display device 1 and its elements in parallel with the Z direction is referred to as plan view. The direction indicated by the arrow along the Z direction may be referred to as upward and the opposite direction as downward.

The display device 1 includes a display panel 2 and a backlight 3. In the example shown in FIG. 1, the backlight 3 is of a side-edge type comprising a light guide LG opposing the display panel 2 and a plurality of light-emitting elements LS opposing a side surface of the light guide LG. The configuration of the backlight 3 is not limited to that of the example in FIG. 1, but can be of any configuration which supplies light necessary for image display.

In the example of FIG. 1, both the display panel 2 and the light guide LG are each formed into rectangular in shape with short sides along the X direction and long sides along the Y direction. The display panel 2 and light guide LG may be of some other shape without being limited to a rectangular shape.

The display panel 2 is a transmissive liquid crystal panel, which comprises a first substrate SUB1 (array substrate), a second substrate SUB2 (counter substrate) opposing the first substrate SUB1 and a liquid crystal layer (LC) sealed between these substrates SUB1 and SUB2. The display panel 2 includes a display area DA of, for example a rectangular shape.

Further, the display device 1 comprises an optical sheet group 4, a first polarizer 5 and a second polarizer 6. The optical sheet group 4 is disposed between the light guide LG and the display panel 2. For example, the optical sheet group 4 includes a diffusion sheet DF which diffuses light emitted from the light guide LG, a first prism sheet PR1 and a second prism sheet PR2, on which a number of prisms are formed.

The first polarizer 5 is disposed between the optical sheet group 4 and the first substrate SUB1. The second polarizer 6 is disposed above the second substrate SUB2. The polarization axis of the first polarizer 5 and the polarization axis of the second polarizer 6 are in a cross-Nicol relationship, which is orthogonal to each other.

The display device 1 can be used, for example, in various devices such as in-vehicle equipment, smartphones, tablet terminals, mobile phone terminals, personal computers, TV receivers, game devices, even head-mounted displays that display images for virtual reality (VR) and the like.

FIG. 2 is a schematic plan view of the display panel 2. The display panel 2 includes a display area DA and a surrounding peripheral area SA. In the example shown in FIG. 2, a lower side of the first substrate SUB1 protrudes further from the second substrate SUB2 in the Y direction. With this configuration, the first substrate SUB1 includes a mount area MA formed therein, which does not overlap the second substrate SUB2. The mount area MA is a part of the peripheral area SA.

In the display area DA, a plurality of pixels PX are arranged in a matrix. The pixels PX each include a plurality of sub-pixels. As an example in this embodiment, the pixel PX contains a red sub-pixel SPR, a green sub-pixel SPG and a blue secondary pixel SPB. But, the pixel PX may as well contain a sub-pixel of some other color such as white.

The display panel 2 comprises a plurality of scanning lines G, a plurality of signal lines S (video lines), a first scan driver GD1, a second scan driver GD2 and a selector circuit ST. The scanning lines G each extend along the X direction and are aligned along the Y direction. The signal lines S each extend along the Y direction and are aligned along the X direction. Each scan line G is connected to at least one of the first scan driver GD1 and the second scan driver GD2. 2. Each signal line S is connected to at least one of the first scan driver GD1 and the second scan driver GD2. Each signal line S is connected to the selector circuit ST.

In the example shown in FIG. 2, the controller CT is mounted in the mount area MA. Further, a terminal T is provided in the mount area MA, and a flexible circuit board F is connected to the terminal T. The controller CT may be mounted on the flexible circuit board F. The controller CT can be constituted by an IC or various types of circuit elements.

The flexible circuit board F inputs various signals to the controller CT, which are sent from a board or the like of an electronic device on which the display device 1 is mounted. Based on the input signals, the controller CT supplies video signals to the selector circuit ST, and the first scan driver GD1, the second scan driver GD2 and the selector circuit ST are controlled. The scan drivers GD1 and GD2 supply scanning signals sequentially to each scan line G. The selector circuit ST supplies the input video signals sequentially to the signal lines S.

The pixels PX each include a pixel electrode PE, a switching element SW (thin-film transistor) and a common electrode CE to which a common voltage is supplied. The switching element SW is connected to the pixel electrode PE, the respective scanning line G and the respective signal line S, and when the scanning signal is supplied to the scanning line G, the video signal of the signal line S is supplied to the pixel electrode PE. The common electrode CE is formed over multiple sub-pixels. When the video signal is supplied to the pixel electrode PE, a potential difference is created between the pixel electrode PE and the common electrode CE, and an electric field generated thereby acts on the liquid crystal layer LC.

In this embodiment, the scanning lines G, the signal lines S, the first scan driver GD1, the second scan driver GD2, the selector circuit ST, the switching elements SW, the pixel electrodes PE and the common electrode CE are all formed on the first substrate SUB1.

Figure 3:
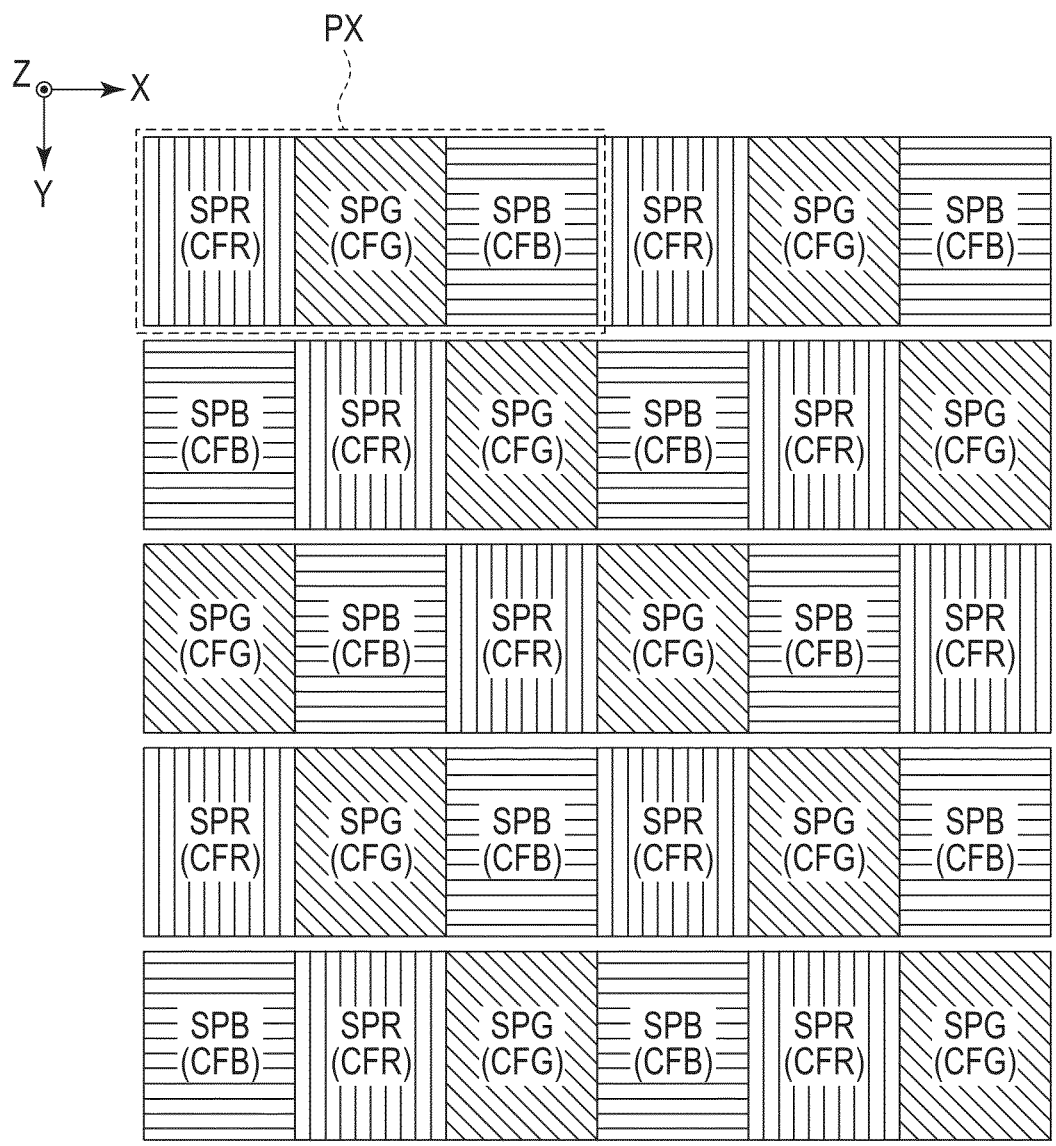
FIG. 3 is a plan view schematically showing a layout of sub-pixels according to the first embodiment.

FIG. 3 is a plan view schematically showing an example of the layout of sub-pixels SPR, SPG and SPB. A red color filter CFR is disposed in the sub-pixel SPR, a green color filter CFG is disposed in the sub-pixel SP and a blue color filter CFB is disposed in the sub-pixel SPB. In this embodiment, the display device 1 has structure of a color-filter-on-array (COA) mode, in which the color filters CFR, CFG and CFB are all arranged on the first substrate SUB1.

In the example shown in FIG. 3, the sub-pixels SPR, SPG and SPB are aligned in this order along the X direction. Further, the sub-pixels SPR, SPB and SPG are aligned in this order along the Y direction. With this configuration, the sub-pixels SPR are aligned in a diagonal direction which intersects the X direction and the Y direction. Similarly, the sub-pixels SPG are aligned along the diagonal direction and the sub-pixels SPB are aligned along the diagonal direction.

The color filters CFR, CFG and CFB are arranged in a dot-like (island-like) manner with relative to the sub-pixels SPR, SPG and SPB.

Note that the layout of the sub-pixels SPR, SPG and SPB and the color filters CFR, CFG and CFB is not limited to that of the example shown here. For example, such configuration may as well do that the sub-pixels SPR are aligned along the Y direction, the sub-pixels SPG are aligned along the Y direction, the sub-pixels SPB are aligned along the Y direction, and the rows of the sub-pixels SPR, the rows of the sub-pixels SPG and the rows of the sub-pixel SPB are aligned along the X direction in the order.

FIG. 4 is cross-sectional view schematically showing a display panel 2. The first substrate SUB1 comprises the signal lines S, the switching elements SW, the pixel electrodes PE, the common electrode CE, and the color filters CFR, CFG and CFB, described above. Although not shown in the cross section of FIG. 4, the first substrate SUB1 comprises the scanning lines G described above, as well.

Further, the first substrate SUB1 comprises a first insulating base 10, a first insulating layer 11, a second insulating layer 12, a third insulating layer 13, a fourth insulating layer 14, an organic insulating layer 15, a first alignment film 16, a metal layer ML, and an antireflection layer AR.

The first insulating base 10 is formed of glass, for example, but may as well be formed of a resin material such as polyimide. The insulating layers 11 to 14 are each formed of an inorganic material such as silicon nitride or silicon oxide. The organic insulating layer 15 is formed of an organic material such as acrylic resin. The pixel electrodes PE and the common electrode CE are each formed of a transparent conductive material such as ITO. The scanning lines G, the signal lines S and the metal layers ML are each formed of a metal material. The scanning lines G, the signal lines S and the metal layer ML may have a single-layer structure formed of a single metal material or a multilayer structure in which different types of metal materials are stacked one on another.

The first insulating layer 11 covers an upper surface (on a side of the second substrate SUB2) of the first insulating base 10. On the first insulating layer 11, a semiconductor layer SC such as of polysilicon, of the switching element SW is disposed. The second insulating layer 12 covers the semiconductor layer SC and the first insulating layer 11.

Although not shown in the cross section of FIG. 4, the scanning lines G are disposed on the second insulating layer 12. The scanning lines G and the semiconductor layer SC intersect at least once. The third insulating layer 13 covers the scanning lines G and the second insulating layer 12. The signal lines S are disposed on the third insulating layer 13. The signal lines S are each in contact with the semiconductor layer SC via a respective contact hole which penetrates the second insulating layer 12 and the third insulating layer 13.

On the signal lines S and the third insulating layer 13, the color filters CFR, CFG and CFB are disposed. The organic insulating layer 15 covers the color filters CFR, CFG and CFB. The color filters CFR, CFG and CFB and the organic insulating layer 15 are formed thicker than the other insulating layers 11 to 14. The organic insulating layer 15 planarizes projections and recesses created by the switching elements SW and the color filters CFR, CFG and CFB.

The pixel electrodes PE are disposed on the organic insulating layer 15. The pixel electrodes PE are in contact with the semiconductor layer SC via a contact hole (contact hole CH1 shown in FIG. 6) which penetrates the organic insulating layer 15. Some other conductive layer may be interposed between the pixel electrodes PE and the semiconductor layer SC. The pixel electrodes PE of the sub-pixels oppose the color filters CFR, CFG and CFB, respectively.

The fourth insulating layer 14 covers the pixel electrodes PE and the organic insulating layer 15. The metal layer ML and the common electrode CE are disposed on the fourth insulating layer 14. The common electrode CE includes slits SL which overlaps the color filters CFR, CFG and CFB along the Z-direction, and oppose the pixel electrodes PE, respectively.

The upper surface of the metal layer ML is covered by the antireflection layer AR. The metal layer ML and the antireflection layer AR are covered by the common electrode CE. The common electrode CE is covered by the first alignment film 16.

The second substrate SUB2 comprises a second insulating substrate 20 formed of a material similar to that of the first insulating base 10, and a second alignment film 21 which covers a lower surface (on a side of the first substrate SUB1) of the second insulating substrate 20. The first substrate SUB1 and the second substrate SUB 2 are adhered together by an annular seal member in the peripheral area SA. Between the first substrate SUB1 and the second substrate SUB2, the liquid crystal layer LC is sealed.

When a video signal is supplied to the pixel electrode PE, an electric field is formed between the pixel electrode PE and the common electrode CE. This electric field acts on the liquid crystal layer LC through the respective slit SL, thereby controlling the alignment of the liquid crystal molecules contained in the liquid crystal layer LC.

FIG. 5 is a cross-sectional view schematically showing the metal layer ML and the antireflection layer AR. In the example illustrated, the metal layer ML has a stacked structure including a first layer L1, a second layer L2 and a third layer L3. The first layer L1 is formed thicker than the second layer L2 and the third layer L3 and is made of aluminum, for example. The second layer L2 and the third layer L3 are formed of molybdenum, for example.

The antireflection layer AR covers the third layer L3. The antireflection layer AR suppresses the reflection of light LT, such as outdoor light. The antireflection layer AR is formed, for example, of metal oxide or black resin, and has a reflectivity lower than that of an upper surface (the surface of the third layer L3) of the metal layer ML. As another example, the antireflection layer AR may as well include a plurality of layers having refractive indices different from each other and reduce reflected light by interference of light reflected by these layers.

FIG. 6 is a plan view schematically showing some of the elements disposed on the first substrate SUB1 in the display area DA. This drawing focuses on one sub-pixel and shows two scanning lines G extending along the X direction and signal lines S extending along the Y direction.

The metal layer ML includes a plurality of first portions MLx extending along the X direction and a plurality of second portions MLy extending along the Y direction arranged in a lattice form. The first portions MLx overlaps the respective scanning lines G. The second portion MLy overlaps the respective signal line S.

Thus, in this embodiment, the metal layer ML is located in both of each boundary between sub-pixels adjacent to each other along the X direction and each boundary between sub-pixels adjacent to each other along the Y direction. The antireflection layer AR is disposed over the entire layer ML including the first portion MLx and the second portion MLy.

In the example of FIG. 6, the width of the first portion MLx is less than the width of the scanning line G. But, here, the width of the first portion MLx may be greater than or equal to the width of the scanning line G. In this case, the entire scanning line G may overlap the first portion MLx.

In the example of FIG. 6, the width of the second portion MLy is greater than the width of the signal line S, and the entire signal line S overlaps the second portion MLy. But, here, the width of the second portion MLy may be less than or equal to the width of the signal line S.

Each adjacent pair of first portions MLx and each respective adjacent pair of second portions MLy define an opening APX surrounded thereby, which is formed for each sub-pixel. The pixel electrode PE overlaps most of the opening APX.

At the position overlapping the first portion MLx, a contact hole CH1 is formed, by which the pixel electrode PE and the semiconductor layer SC are connected to each other (see FIG. 4). The contact hole CH1 penetrates the organic insulating layer 15 described above.

In the example of FIG. 6, one slit SL is provided in the area overlapping the opening APX. The slit SL includes a plurality of portions inclined, for example, with respect to the X and Y directions. A plurality of slits SL may be provided for the opening APX.

Figure 7:
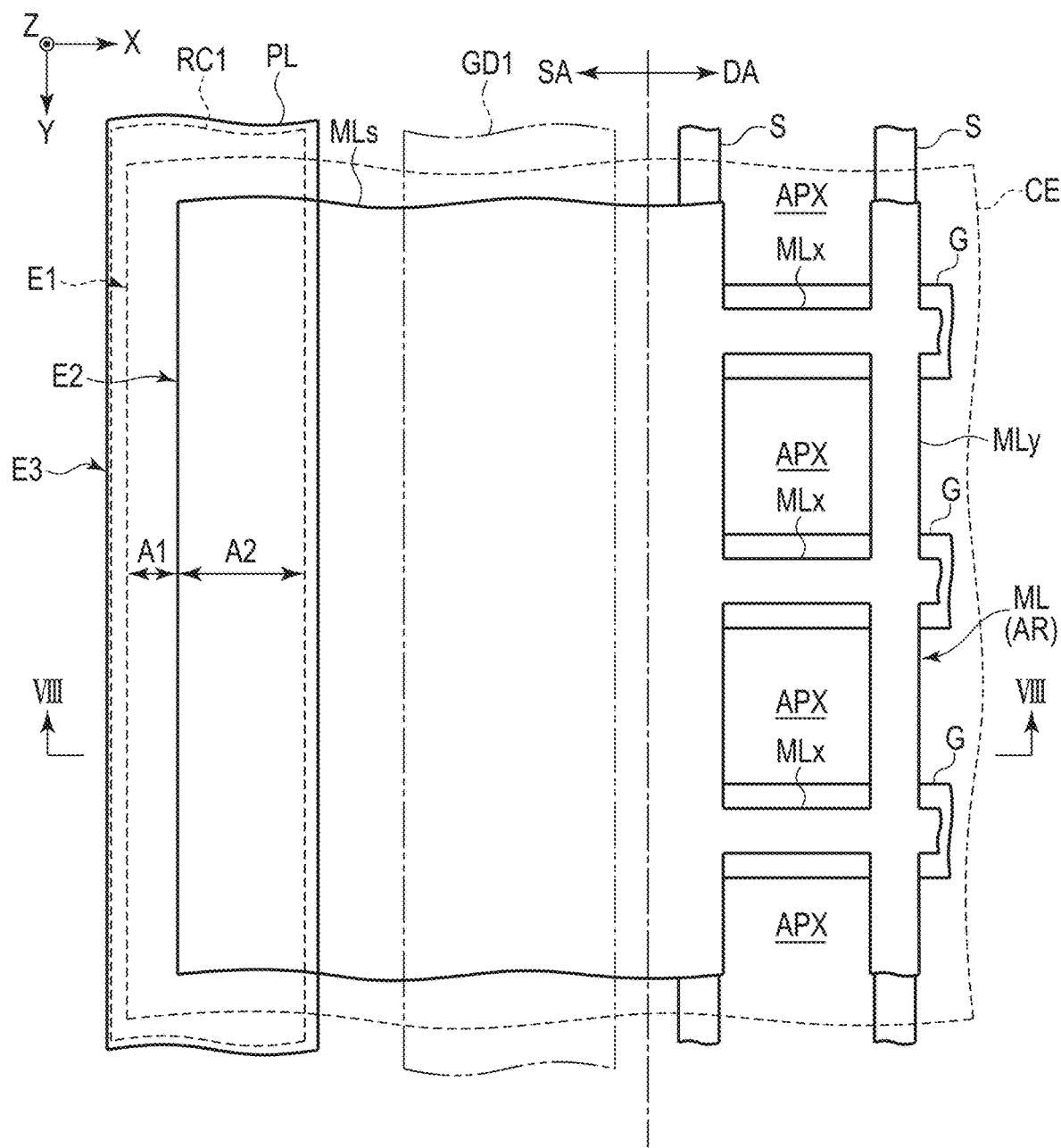
FIG. 7 is a plan view schematically showing a part of a peripheral area of the first substrate of the first embodiment.
Figure 8:
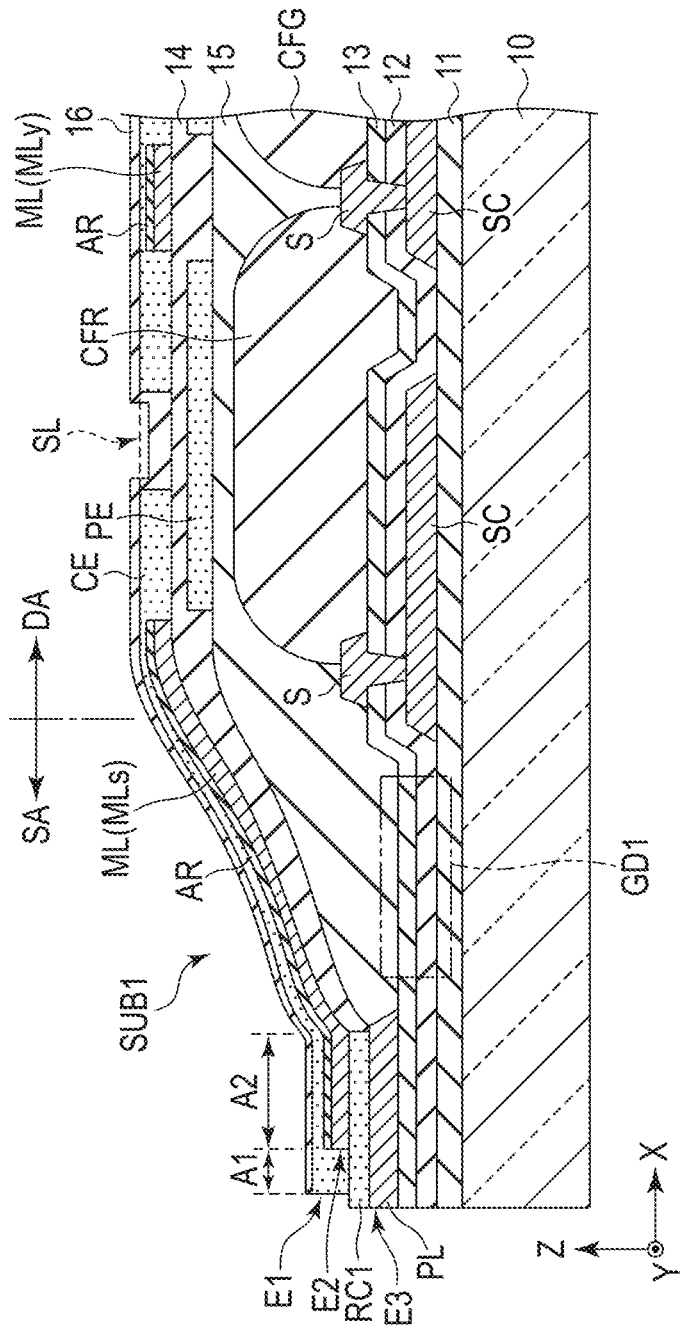
FIG. 8 is a cross-sectional view schematically showing of the first substrate taken along line VIII-VIII in FIG. 7.

FIG. 7 is a plan view schematically showing a part of the first substrate SUB1 in the peripheral area SA. FIG. 8 is a cross-sectional view schematically showing the substrate SUB1 taken along line VIII-VIII in FIG. 7. As shown in FIGS. 7 and 8, the first substrate SUB1 comprises a power supply line PL and a relay conductive layer RC1 (a first relay conductive layer 1) in the peripheral area SA. The supply line PL and the relay conductive layer RC1 are located below the common electrode CE and the metal layer ML are located below the common electrode CE and the metal layer ML.

For example, the power supply line PL is formed to surround the display area DA along three sides of the first substrate SUB1 excluding the mount area MA. A common voltage is supplied to the power supply line PL. The relay conductive layer RC1 overlaps the power supply line PL. The relay conductive layer RC1, as in the case of the power supply line PL, for example, is formed to surround the display area DA along the three sides of the first substrate SUB1, excluding the mount area MA.

In the example of FIG. 7, the first scan driver GD1 is disposed between the power supply line PL and the display area DA. Although not shown in FIG. 7, the second scan driver GD2 described above as well is disposed between the power supply line PL and the display area DA.

The common electrode CE is formed not only in the display area DA but also in the peripheral area SA. The common electrode CE overlaps the entire first scan driver GD1, and overlaps respective parts of the power supply line PL and the relay conductive layer RC1.

The metal layer ML includes a third portion MLs in the peripheral area SA. The third portion MLs overlaps the entire first scan driver GD1 and overlaps parts of the power supply line PL and the relay conductive layer RC1.

That is, an end portion E1 (a first end portion) of the common electrode CE and an end portion E2 (a second end portion) of the third portion MLs are both located in the peripheral area SA. Further, in the example of FIG. 7, the end portion E2 is located between the end portion E1 and the display area DA.

Both the end portion E1 and the end portion E2 overlap the power supply line PL and the relay conductive layer RC1. The end portion E1 is located between the end portion E2 and the end portion E3 of the supply line PL. Note that the end portions E1, E2 and E3 are equivalent to outer edges of the common electrode CE, the metal layer ML and the power supply line PL, respectively. The end portion of the relay conductive layer RC1 is substantially coincident with the end portion E3. The relationship between the end portions E1, E2 and E3 shown in FIG. 7 can be applied to the vicinities of other edges of the first substrate SUB1 except for the mount area MA.

As shown in FIG. 8, the power supply line PL is disposed on the third insulating layer 13. In the peripheral area SA, the thickness of the organic insulating layer 15 decreases gradually toward the power supply line PL. For example, the power supply line PL can be formed from the same metal material and by the same process as those of the signal line S.

The relay conductive layer RC1 covers the upper surface of the power supply line PL. For example, the relay conductive layer RC1 can be formed from the same process and by the same process as those of the pixel electrode PE. The fourth insulating layer 14 is formed in the peripheral area SA as well, but does not cover the upper surface of the relay conductive layer RC1.

The third portion MLs is disposed on the fourth insulating layer 14 and a part thereof is located above the relay conductive layer RC1. The upper surface of the third portion MLs is entirely covered by the antireflection layer AR. The common electrode CE covers the antireflection layer on the third portion MLs in the peripheral area SA. Further, the common electrode CE is located between the end portion E2 of the third portion MLs and the end portion E3 of the supply line PL and on the relay conductive layer RC1.

That is, the common electrode CE is in contact with the relay conductive layer RC1 between the end portions E1 and E2 in the first area A1. With this configuration, the common electrode CE and the supply line PL are connected to each other via the relay conductive layer RC1, and the common voltage of the power supply line PL is supplied to the common electrode CE via the relay conductive layer RC1.

Further, the third portion MLs is in contact with the upper surface of the relay conductive layer RC1 in the second area A2 located between the first area A1 and the display area DA. With this configuration, the metal layer ML and the power supply line PL are connected to each other via the relay conductive layer RC1, and the common voltage of the power supply line PL is supplied to the metal layer ML via the relay conductive layer RC1.

In the embodiment provided above, the metal layer ML overlapping the scanning lines G and signal lines S is disposed on the first substrate SUB1, and further, the upper surface of the metal layer ML is covered by the antireflection layer AR. With this configuration, the reflection of external light by the scanning lines G, the signal lines S and the metal layer ML is suppressed, and therefore, a display device 1 with excellent visibility of the image displayed in the display area DA can be obtained.

Further, in the peripheral area SA as well, elements including metal materials such as the first scan driver GD1 overlap the metal layer ML (the third portion MLs) and the antireflection layer AR. Thus, the reflection of external light in the peripheral area SA can as well be suppressed.

Let us suppose here that, as in the present embodiment, a color filter is formed on the first substrate SUB1, which is an array substrate, and a light-shielding layer (black matrix) equivalent to an antireflection layer AR is provided on the second substrate SUB2. In this case, misalignment between the metal layer ML or color filter and the light-shielding layer may occur. But, with the configuration of this embodiment, such misalignment can be suppressed.

In this embodiment, the metal layer ML covered by the antireflection layer AR is further covered by the common electrode CE. With this configuration, sufficient conduction between the common electrode CE and the metal layer ML may not be ensured in the display area DA. Further, in the case where the metal layer covered by the antireflection layer AR is formed below the common electrode CE in the peripheral area SA as well, it is difficult to supply the common voltage of the supply line PL to the common electrode CE.

With regard to this point, in this embodiment, the end portion E2 of the metal layer ML is located between the end portion E1 of the common electrode CE and the display area DA, and thus both the metal layer ML and the common electrode CE are connected to the power supply line PL via the relay conductive layer RC1. With this configuration, the common voltage of the power supply line PL can be supplied to both the common electrode CE and the metal layer ML.

Second Embodiment

The second embodiment will now be described. The portions of the configuration of the display device 1, which are not specifically pointed out, are similar to those of the first embodiment.

Figure 9:
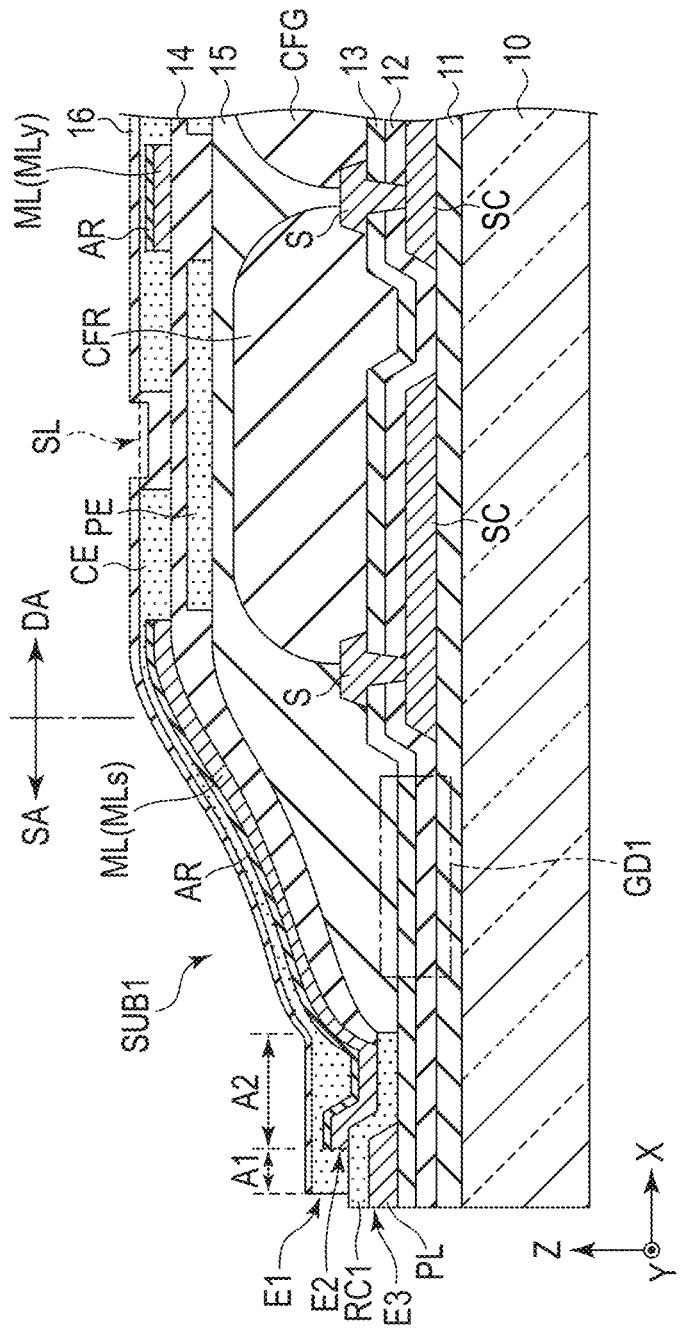
FIG. 9 is a cross-sectional view schematically showing a first substrate according to the second embodiment.

FIG. 9 is cross-sectional view schematically showing a first substrate SUB1 according to the second embodiment. The example shown in FIG. 9 is different from that of FIG. 8 in that the width of the power supply line PL is less than the width of the relay conductive layer RC1.

Here, even if the width of the supply line PL is small, the first area A1 and the second area A2 can be secured wide by providing the relay conductive layer RC1. With this configuration, it possible to supply a common voltage from the power supply line PL to the common electrode CE and the metal layer ML in an excellent manner.

Third Embodiment

The third embodiment will now be described. The portions of the configuration of the display device 1, which are not specifically pointed out, are similar to those of the first embodiment.

Figure 10:
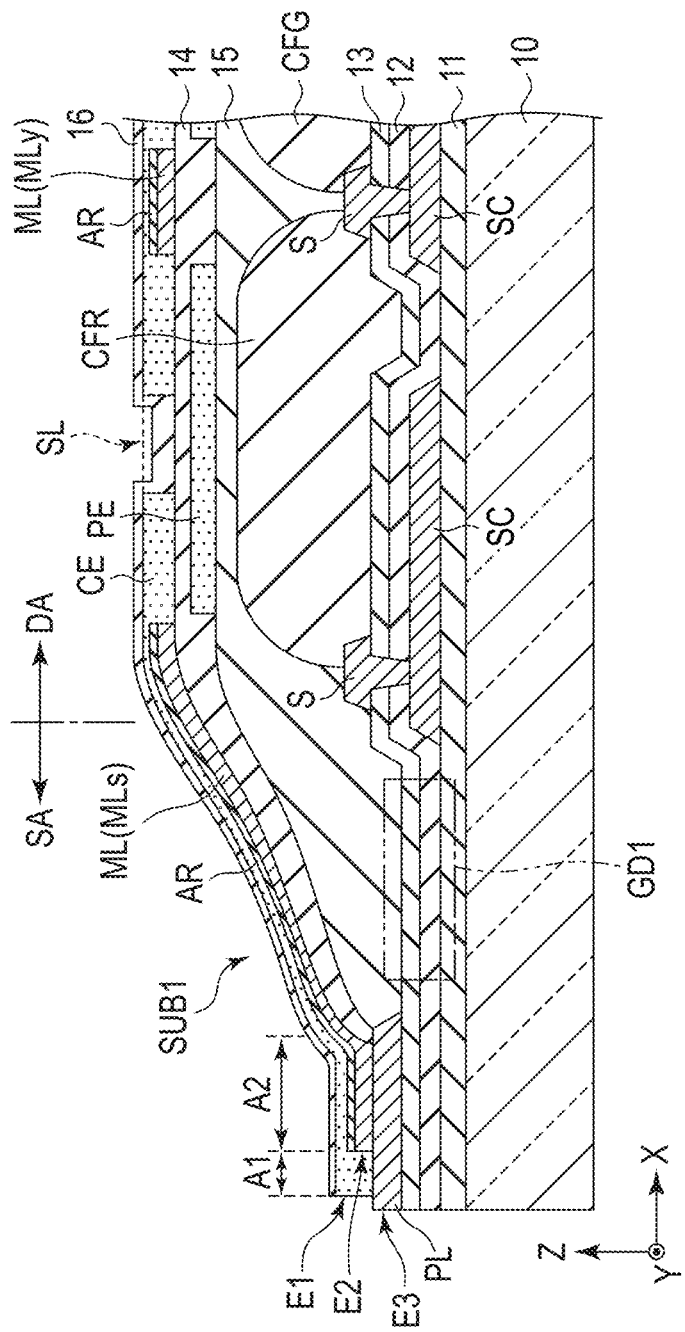
FIG. 10 is a cross-sectional view schematically showing a first substrate according to the third embodiment.

FIG. 10 is cross-sectional view schematically showing a first substrate SUB1 according to the third embodiment. The example shown in FIG. 10 is different from that of FIG. 8 in that the relay conductive layer RC1 is not disposed in the peripheral area SA. The common electrode CE is in contact with the upper surface of the supply line PL in the first area A1. The third portion MLs of the metal layer ML is in contact with the upper surface of the power supply line PL in the second area A2.

Even if the relay conductive layer RC1 is not provided as described above, the common voltage can be supplied from the power supply line PL to the common electrode CE and the metal layer ML.

Fourth Embodiment

The fourth embodiment will now be described. This embodiment disposes a configuration for electrically connecting the common electrode CE and the metal layer ML to each other in the display area DA. The portions of the configuration of the display device 1, which are not specifically pointed out, are similar to those of the first embodiment.

Figure 11:
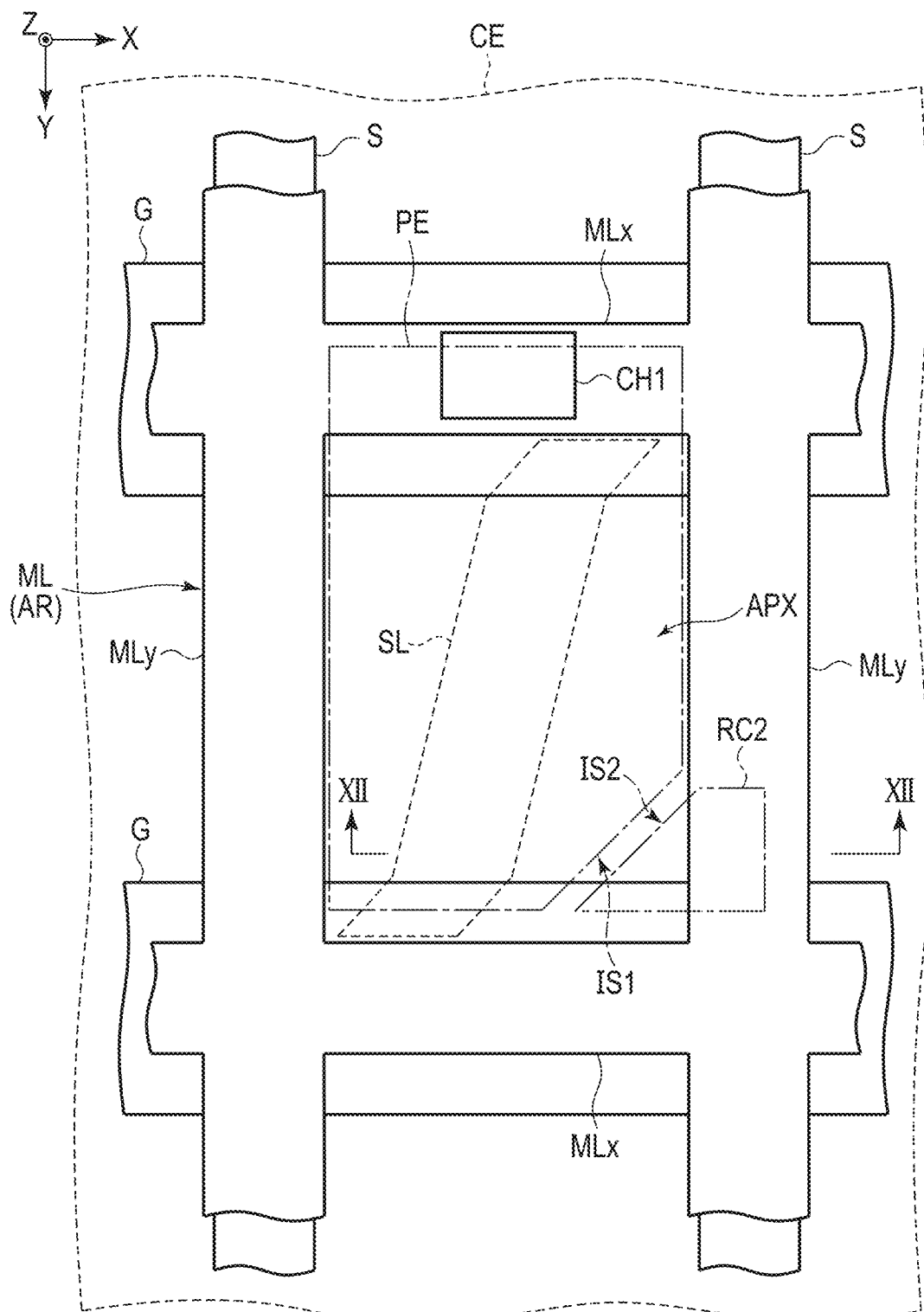
FIG. 11 is a plan view schematically showing some of elements disposed on a first substrate according to the fourth embodiment.

FIG. 11 is a partial plan view schematically showing some of the elements disposed on a first substrate SUB1 according to the fourth embodiment. FIG. 12 is a cross-sectional view schematically showing the first substrate SUB1 taken along line XII-XII in FIG. 11. The example shown in FIGS. 11 and 12 is different from the example of FIG. 6 in that the relay conductive layer RC2 (second relay conductive layer) is further provided.

The relay conductive layer RC2 is placed, for example, in the vicinity of the intersection between the respective scanning line G and the respective signal line S. In the example of FIG. 11, the relay conductive layer RC2 is trapezoidal in shape and overlaps the second portion MLy of the metal layer ML.

As shown in FIG. 12, the relay conductive layer RC2 is disposed on the organic insulating layer 15 (in the same layer as that of the pixel electrode PE) and is separated from the pixel electrode PE. The relay conductive layer RC2 can be formed of a transparent conductive material such as ITO. For example, the relay conductive layer RC2 and the pixel electrode PE are formed by the same process.

The fourth insulating layer 14 includes an opening AP at a position overlapping the relay conductive layer RC2. Via the opening AP, the metal layer ML (the second portion MLy) and the common electrode CE are in contact with the relay conductive layer RC2. With this configuration, the common electrode CE and the metal layer ML are electrically connected to each other via the relay conductive layer RC2 in an excellent manner.

Note that in FIG. 6 described above, the pixel electrode PE has a rectangular shape with a pair of short sides along the X direction and a pair of long sides along the Y direction. On the other hand, in the example of FIG. 11, the pixel electrode PE includes an inclined side IS1 inclined with respect to the X direction and the Y direction in a corner portion. Further, the relay conductive layer RC2 includes an inclined side IS2 opposing the inclined side IS1. The inclined side IS2 is separated from the inclined side IS1 and parallel to the inclined side IS1.

With such a configuration, the distance between the relay conductive layer RC2 and the slit SL can be can be maintained large while securing a large area of the relay conductive layer RC2 as compared to, for example, the case where the relay conductive layer RC2 has a rectangular shape without the inclined side IS2. Thus, display error caused by the relay conductive layer RC2 can be suppressed.

Note that the relay conductive layer RC2 may be provided one for all sub-pixels included in the display area DA, or may be arranged at a ratio of one for multiple sub-pixels. Or, multiple relay conductive layers RC2 may be provided for one sub-pixel.

With the configuration of this embodiment, the common electrode CE and the metal layer ML are electrically connected to each other in the display area DA in an excellent manner. Thus, it is possible to lower the resistance of the common electrode CE formed of a transparent conductive material. Further, when the relay conductive layer RC2 is formed by the same process as that of the pixel electrode PE, no additional processing step is required to form the relay conductive layer RC2.

Fifth Embodiment

The fifth embodiment will now be described. The portions of the configuration of the display device 1, which are not specifically pointed out, are similar to those of the fourth embodiment.

FIG. 13 is a cross-sectional view schematically showing a first substrate SUB1 according to this embodiment. In the example of FIG. 13, the relay conductive layer RC2 is disposed on the fourth insulating layer 14 and the metal layer ML (second portion MLy) is disposed on the relay conductive layer RC2. The relay conductive layer RC2 includes a region which is not covered by the metal layer ML, and the common electrode CE is in contact with this region. The relay conductive layer RC2 can be formed of a transparent conductive material as in the case of the fourth embodiment.

Even with the configuration of this embodiment, the common electrode CE and the metal layer ML are electrically connected to each other via the relay conductive layer RC2 in the display area DA in an excellent manner. Further, since the pixel electrode PE and the relay conductive layer RC2 are located in layers different from each other, short circuit therebetween can be suppressed. Therefore, as shown in FIG. 13, for example, it is possible to adopt a configuration in which a part of the pixel electrode PE opposes the relay conductive layer RC2.

Sixth Embodiment

The sixth embodiment will now be described. This embodiment discloses another structure for electrically connecting the common electrode CE and the metal layer ML to each other in the display area DA. The portions of the configuration of the display device 1, which are not specifically pointed out, are similar to those of each of the embodiments provided above.

Figure 14:
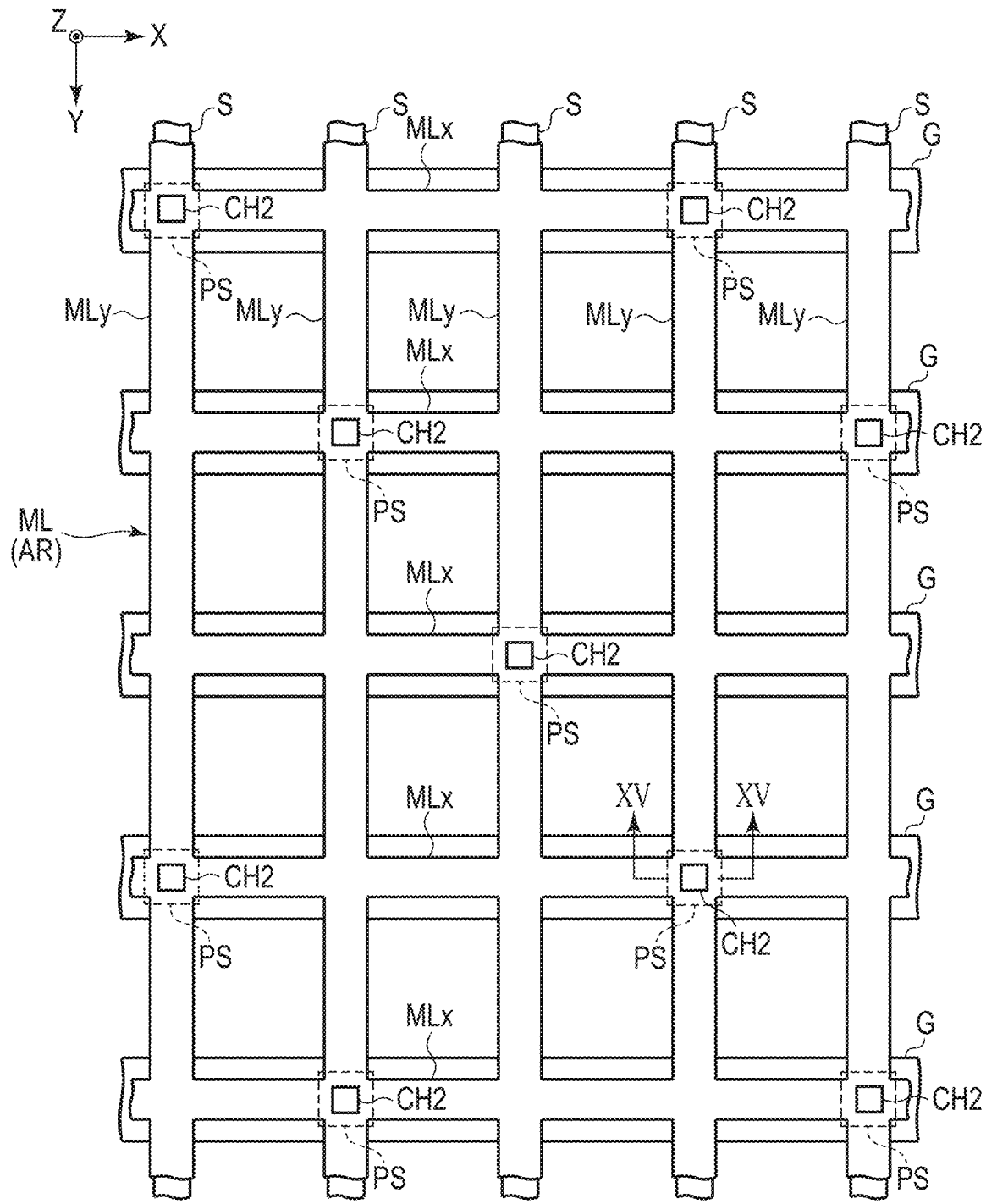
FIG. 14 is a plan view schematically showing a metal layer, scanning lines and signal lines according to the sixth embodiment.

FIG. 14 is a plan view schematically showing the metal layer ML, the scanning lines G and the signal lines S in this embodiment. In this embodiment, the antireflection layer AR includes a plurality of contact holes CH2.

In the example of FIG. 14, each contact hole CH2 is located at the position where the respective scanning line G and the respective signal line S intersect each other (the position where the first portion MLx and the second portion MLy of the metal layer ML are connected to each other). Two contact holes CH2 adjacent to each other along the X direction are separated by a distance of three sub-pixels. Two contact holes CH2 adjacent to each other along the Y direction as well are separated by a distance of three sub-pixels. But the arrangement of the contact holes CH2 is not limited to that of this example.

FIG. 15 is a cross-sectional view schematically showing the display panel 2 taken along line XV-XV in FIG. 14. The contact holes CH2 form exposed areas EA on the upper surface of the metal layer ML, which are not covered by the antireflection layer AR. The common electrode CE is in contact with the exposed areas EA. That is, the common electrode CE is electrically connected to the metal layer ML via the contact holes CH2.

Further, in this embodiment, a columnar spacer PS is provided to oppose each exposed area EA. The spacer PS is formed, for example, of a light-shielding material such as black resin and is located between the first substrate SUB1 and the second substrate SUB2. The spacer PS is provided to oppose each contact hole CH2 as shown in FIG. 14.

For example, the spacer PS is formed in the first substrate SUB1 and a distal end thereof is in contact with the second substrate SUB2. As another example, the spacers PS may be formed on the second substrate SUB2 and a distal end thereof may be in contact with the first substrate SUB1.

With such a configuration as described above, the common electrode CE and the metal layer ML are electrically connected to each other via the contact holes CH2 in an excellent manner. Further, since the light-shielding spacers PS are located above the contact holes CH2, the reflection of external light by the surface portions of the metal layer ML, which are exposed through the contact holes CH2, can be suppressed.

Seventh Embodiment

The seventh embodiment will now be described. The portions of the configuration of the display device 1, which are not specifically pointed out, are similar to those of the sixth embodiment.

Figure 16:
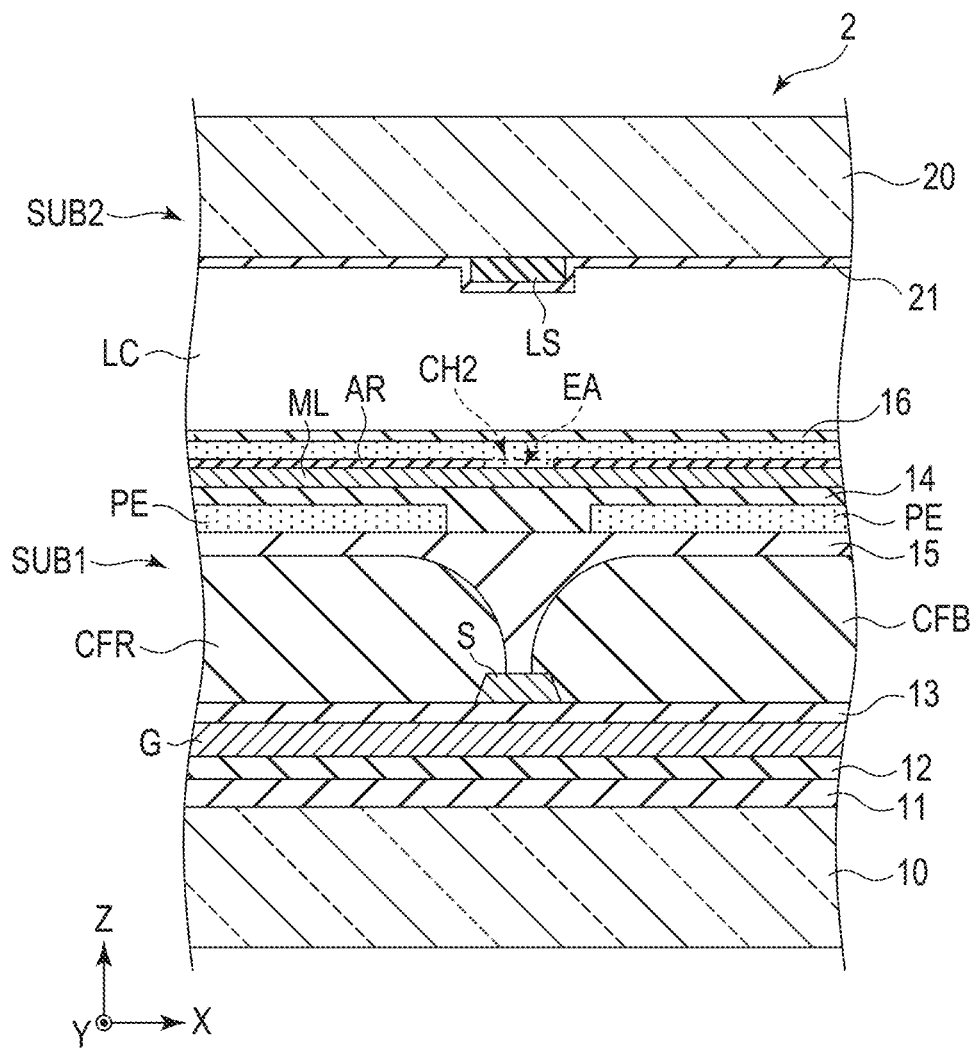
FIG. 16 is a cross-sectional view schematically showing a display panel according to the seventh embodiment.

FIG. 16 a cross-sectional view schematically showing the display panel 2 of this embodiment. In the example of FIG. 16, in place of the spacers PS, the light-shielding layer LS opposing the exposed areas EA is disposed on the second substrate SUB2. The light-shielding layer LS is formed, for example, of a light-shielding material such as black resin and is located between the second insulating substrate 20 and the second alignment film 21.

The planar shape of the light-shielding layer LS is similar to the planer shape of the spacers PS shown in FIG. 14, for example. That is, the light-shielding layer LS is not placed entirely above the metal layer ML, but is placed in an island-like manner shape in positions overlapping the contact holes H2.

Even with this configuration, the common electrode CE and the metal layer ML are electrically connected to each other via the contact holes CH2 in an excellent manner. Further, it is possible to suppress the reflection of external light by the exposed areas EA.

Eighth Embodiment

The eighth embodiment will be described. The portions of the configuration of the display device 1, which are not specifically pointed out, are similar to those of each of the above-described embodiments.

FIG. 17 is cross-sectional view schematically showing a first substrate SUB1 according to this embodiment. In the example of FIG. 17, the metal layer ML is disposed on the common electrode CE. The metal layer ML is covered by the antireflection layer AR, and further the antireflection layer AR is covered by the first alignment film 16.

With this configuration, the common electrode CE and the metal layer ML can be electrically connected to each other without being blocked by the antireflection layer AR which covers the metal layer ML.

Ninth Embodiment

The ninth embodiment will now be described. The portions of the configuration of the display device 1, which are not specifically pointed out, are similar to those of each of the above-described embodiments.

FIG. 18 is a cross-sectional view schematically showing a first substrate SUB1 of this embodiment. In the example of FIG. 18, the common electrode CE is disposed on the organic insulating layer 15 and covered by the fourth insulating layer 14. Further, the pixel electrode PE is disposed on the fourth insulating layer 14 and covered by the first alignment film 16.

The metal layer ML is disposed on the organic insulating layer 15 and covered by the antireflection layer AR. The antireflection layer AR is covered by the common electrode CE.

Thus, even when the pixel electrode PE is located above the common electrode CE, the configuration of each of the above embodiments can be applied.

Note that in each of the embodiments, the case where the metal layer ML includes a first portion MLx overlapping the scanning line G and a second portion MLy overlapping with the signal line S is described as an example. As another example, the metal layer ML may include only one of the first portion MLx and the second portion MLy.

In each of the embodiments, the case where the color filters CFR, CFG and CFB are provided on the first substrate SUB1 is described as an example. As another example, the color filters CFR, CFG and CFB may be provided on the second substrate SUB2.

Based on the display device which has been described in the above-described embodiments, a person having ordinary skill in the art may achieve a display device with an arbitral design change; however, as long as they fall within the scope and spirit of the present invention, such a display device is encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

The following is an example of a display device obtained from each of the above-mentioned embodiments as an appendix.

[1]
A display device comprising:
a display area including a pixel;
a peripheral area around the display area;
a pixel electrode disposed in the pixel;
a switching element connected to the pixel electrode;
a scanning line which supplies a scanning signal to the switching element;
a signal line which supplies a video signal to the switching element;
a metal layer which overlaps at least one of the signal line and the scanning line;
an antireflection layer which covers the metal layer;
a common electrode which covers the antireflection layer; and
a power supply line disposed in the peripheral area, to which a common voltage is supplied,
wherein
the common electrode and the metal layer are connected to the power supply line in the peripheral area.

[2]
The display device of item [1] above, wherein
the common electrode includes a first end portion located in the peripheral area,
the metal layer includes a second end portion located in the peripheral area, and
the second end portion is located between the first end portion and the display area.

[3]
The display device of item [1] or [2] above, further comprising:
a first relay conductive layer disposed in the peripheral area and in contact with the power supply line,
wherein
the power supply line and the first relay conductive layer are located below the metal layer and the common electrode, and
the metal layer and the common electrode are in contact with an upper surface of the first relay conductive layer.

[4]
The display device of item [3] above, wherein
the peripheral area includes:
a first area where the common electrode is in contact with the first relay conductive layer, and
a second area where the metal layer is in contact with the first relay conductive layer, and
the second area is located between the first area and the display area.

[5]
The display device of any one of items [1] to [4] above, further comprising:
a second relay conductive layer disposed in the display area and in contact with the metal layer and the common electrode.

[6]
The display device of item [5] above, further comprising:
an insulating layer located between the pixel electrode and the common electrode,
wherein
the second relay conductive layer is disposed in a same layer as that of the pixel electrode,
the insulating layer includes an opening which overlaps the second relay conductive layer, and
the common electrode and the metal layer are in contact with the second relay conductive layer via the opening.

[7]
The display device of item [5] above, further comprising:
an insulating layer located between the pixel electrode and the common electrode,
wherein
the common electrode and the second relay conductive layer are disposed on the insulating layer, and
the metal layer is disposed on the second relay conductive layer.

[8]
The display device of any one of items [1] to [7] above, wherein
the metal layer includes an exposed area which is not covered by the antireflection layer, and
the common electrode is in contact with the exposed area.

[9]
The display device of item [8] above, wherein
the exposed area is provided at a position where the scanning line and the signal line intersect each other.

[10]
The display device of item [8] or [9] above, further comprising:
a first substrate including the pixel electrode, the switching element, the scanning line, the signal line, the metal layer, the antireflection layer, the common electrode and the power supply line;
a second substrate opposing the first substrate; and
a light-shielding spacer located between the first substrate and the second substrate and opposing the exposed area.

[11]
The display device of item [8] or [9] above, further comprising:
a first substrate including the pixel electrode, the switching element, the scanning line, the signal line, the metal layer, the antireflection layer, the common electrode and the power supply line;
a second substrate opposing the first substrate; and
a light-shielding layer provided on the second substrate and opposing the exposed area.

[12]
The display device of item [10] or [11] above, wherein the first substrate further comprises a color filter opposing the pixel electrode.

[13]
A display device comprising:
a display area including a pixel;
a pixel electrode disposed in the pixel;
a switching element connected to the pixel electrode;
a scanning line which supplies a scanning signal to the switching element;
a signal line which supplies a video signal to the switching element;
a metal layer which overlaps at least one of the signal line and the scanning line;
an antireflection layer which covers the metal layer;
a common electrode which covers the antireflection layer; and
a relay conductive layer disposed in the display area and in contact with the metal layer and the common electrode.

[14]
The display device of item [13] above, further comprising:
an insulating layer located between the pixel electrode and the common electrode,
wherein
the relay conductive layer is disposed in a same layer as that of the pixel electrode,
the insulating layer includes an opening which overlaps the relay conductive layer, and
the common electrode and the metal layer are in contact with the relay conductive layer via the opening.

[15]
The display device of item [13] further comprising:
an insulating layer located between the pixel electrode and the common electrode,
wherein
the common electrode and the relay conductive layer are disposed on the insulating layer, and
the metal layer is disposed on the relay conductive layer.

[16]
A display device comprising:
a display area including a pixel;
a pixel electrode disposed in the pixel;
a switching element connected to the pixel electrode;
a scanning line which supplies a scanning signal to the switching element;
a signal line which supplies a video signal to the switching element;
a metal layer which overlaps at least one of the signal line and the scanning line;
an antireflection layer which covers the metal layer; and
a common electrode which covers the antireflection layer,
wherein
the metal layer includes an exposed area which is not covered by the antireflection layer, and
the common electrode is in contact with the exposed area.

[17]
The display device of item [16] above, wherein
the exposed area is provided at a position where the scanning line and the signal line intersect each other.

[18]
The display device of item [16] or [17] above, further comprising:
a first substrate including the pixel electrode, the switching element, the scanning line, the signal line, the metal layer, the antireflection layer and the common electrode;
a second substrate opposing the first substrate; and
a light-shielding spacer located between the first substrate and the second substrate and opposing the exposed area.

[19]
The display device of item [16] or [17] above, comprising;
a first substrate including the pixel electrode, the switching element, the scanning line, the signal line, the metal layer, the antireflection layer and the common electrode;
a second substrate opposing the first substrate; and
a light-shielding layer provided on the second substrate and opposing the exposed area.

[20]
The display device of item [18] or [19] above, wherein the first substrate further comprises a color filter opposing the pixel electrode.

What is claimed is:
1. A display device comprising:
a display area including a pixel;
a peripheral area around the display area;
a pixel electrode disposed in the pixel;
a switching element connected to the pixel electrode;
a scanning line which supplies a scanning signal to the switching element;
a signal line which supplies a video signal to the switching element;
a metal layer which overlaps at least one of the signal line and the scanning line;
an antireflection layer which covers the metal layer;
a common electrode which covers the antireflection layer; and
a power supply line disposed in the peripheral area, to which a common voltage is supplied,
wherein
the common electrode and the metal layer are connected to the power supply line in the peripheral area,
the common electrode includes a first end portion located in the peripheral area,
the metal layer includes a second end portion located in the peripheral area, and
the second end portion is located between the first end portion and the display area.

2. The display device of claim 1, further comprising:
a first relay conductive layer disposed in the peripheral area and in contact with the power supply line,
wherein
the power supply line and the first relay conductive layer are located below the metal layer and the common electrode, and
the metal layer and the common electrode are in contact with an upper surface of the first relay conductive layer.

3. The display device of claim 2, wherein
the peripheral area includes:
a first area where the common electrode is in contact with the first relay conductive layer, and
a second area where the metal layer is in contact with the first relay conductive layer, and
the second area is located between the first area and the display area.

4. The display device of claim 1, further comprising:
a second relay conductive layer disposed in the display area and in contact with the metal layer and the common electrode.

5. The display device of claim 4, further comprising:
an insulating layer located between the pixel electrode and the common electrode,
wherein
the second relay conductive layer is disposed in a same layer as that of the pixel electrode,
the insulating layer includes an opening which overlaps the second relay conductive layer, and
the common electrode and the metal layer are in contact with the second relay conductive layer via the opening.

6. The display device of claim 4, further comprising:
an insulating layer located between the pixel electrode and the common electrode,
wherein
the common electrode and the second relay conductive layer are disposed on the insulating layer, and
the metal layer is disposed on the second relay conductive layer.

7. The display device of claim 1, wherein
the metal layer includes an exposed area which is not covered by the antireflection layer, and
the common electrode is in contact with the exposed area.

8. The display device of claim 7, wherein
the exposed area is provided at a position where the scanning line and the signal line intersect each other.

9. The display device of claim 7, further comprising:
a first substrate including the pixel electrode, the switching element, the scanning line, the signal line, the metal layer, the antireflection layer, the common electrode and the power supply line;
a second substrate opposing the first substrate; and
a light-shielding layer provided on the second substrate and opposing the exposed area.

10. The display device of claim 7, further comprising:
a first substrate including the pixel electrode, the switching element, the scanning line, the signal line, the metal layer, the antireflection layer, the common electrode and the power supply line;
a second substrate opposing the first substrate; and
a light-shielding spacer located between the first substrate and the second substrate and opposing the exposed area.

11. The display device of claim 10, wherein
the first substrate further comprises a color filter opposing the pixel electrode.

12. A display device comprising:
a display area including a pixel;
a pixel electrode disposed in the pixel;
a switching element connected to the pixel electrode;
a scanning line which supplies a scanning signal to the switching element;
a signal line which supplies a video signal to the switching element;
a metal layer which overlaps at least one of the signal line and the scanning line;
an antireflection layer which covers the metal layer;
a common electrode which covers the antireflection layer; and
a relay conductive layer disposed in the display area and in contact with the metal layer and the common electrode,
wherein
the common electrode includes a first end portion located in the peripheral area,
the metal layer includes a second end portion located in the peripheral area, and
the second end portion is located between the first end portion and the display area.

13. The display device of claim 12, further comprising:
an insulating layer located between the pixel electrode and the common electrode,
wherein
the relay conductive layer is disposed in a same layer as that of the pixel electrode,
the insulating layer includes an opening which overlaps the relay conductive layer, and
the common electrode and the metal layer are in contact with the relay conductive layer via the opening.

14. The display device of claim 12, further comprising:
an insulating layer located between the pixel electrode and the common electrode,
wherein
the common electrode and the relay conductive layer are disposed on the insulating layer, and
the metal layer is disposed on the relay conductive layer.

15. A display device comprising:
a display area including a pixel;
a pixel electrode disposed in the pixel;
a switching element connected to the pixel electrode;
a scanning line which supplies a scanning signal to the switching element;
a signal line which supplies a video signal to the switching element;
a metal layer which overlaps at least one of the signal line and the scanning line;
an antireflection layer which covers the metal layer; and
a common electrode which covers the antireflection layer,
wherein
the metal layer includes an exposed area which is not covered by the antireflection layer, and
the common electrode is in contact with the exposed area.

16. The display device of claim 15, wherein
the exposed area is provided at a position where the scanning line and the signal line intersect each other.

17. The display device of claim 15, comprising;
a first substrate including the pixel electrode, the switching element, the scanning line, the signal line, the metal layer, the antireflection layer and the common electrode;
a second substrate opposing the first substrate; and
a light-shielding layer provided on the second substrate and opposing the exposed area.

18. The display device of claim 15, further comprising:
a first substrate including the pixel electrode, the switching element, the scanning line, the signal line, the metal layer, the antireflection layer and the common electrode;
a second substrate opposing the first substrate; and
a light-shielding spacer located between the first substrate and the second substrate and opposing the exposed area.

19. The display device of claim 18, wherein the first substrate further comprises a color filter opposing the pixel electrode.

* * * * *